UNITED STATES PATENT OFFICE.

HUBERT CLIFTON MARRIS, OF BOLTON, ENGLAND, ASSIGNOR TO WILLIAM WALKER AND SONS LIMITED, OF BOLTON, ENGLAND, AN ENGLISH COMPANY.

GAS-PURIFYING COMPOSITION AND METHOD OF MAKING SAME.

1,379,462. Specification of Letters Patent. Patented May 24, 1921.

No Drawing. Application filed September 15, 1920. Serial No. 410,554.

*To all whom it may concern:*

Be it known that I, HUBERT CLIFTON MARRIS, a subject of the King of Great Britain, and resident of Bolton, in the county of Lancaster, England, have invented a certain new and useful Improvement in a Gas-Purifying Composition and Method of Making Same, of which the following is a specification.

My invention relates to the treatment of refuse from tanneries and the like and particularly to the treatment of the spent lime and the vegetable matter from which the tanning materials have been extracted so as to employ same in the production of ferric oxid or ferric hydrate which may be appropriately used in connection with the extraction of hydrogen sulfid or like sulfur compounds from coal gas, or for equivalent uses. In accordance with my invention I use the vegetable matter referred to as an absorbent for a soluble compound of iron and for mixing with the spent lime compound to produce the ferric oxid or ferric hydrate, which latter, by its mixture with the spent vegetable matter forms an appropriate medium (by said vegetable matter being of a spongy or very open or porous character) for the percolation of coal or other gas from which the sulfur compounds have to be extracted, since by its porosity the ferric oxid or ferric hydrate it contains is spread over a very large surface that is free to be impinged upon by the gases being treated.

In carrying my invention into effect I make use of a soluble compound of iron which may be in the form of a solution of iron chlorid or sulfate (such as is obtained as a by-product from wire works, tin plate manufactories or galvanizing works) and mix same so that it is absorbed by the spent vegetable matter from tanneries.

After this absorption I add thereto the spent lime from tanneries (which contains colloidal matters) so that the mixture results in the formation of a chemical compound by the action of the lime compounds on the ferric chlorid.

The ferric oxid or ferric hydrate and the other compounds produced remain in admixture with said spent vegetable matter, leaving the whole in a porous condition through which the coal gas to be treated may readily percolate.

I may employ spent lime from other works such as from glue factories or from gelatin factories and employ an alternative form of soluble iron compound from which the ferric oxid or ferric hydrate may be produced.

In some tanneries a much greater proportion of spent vegetable matter is left in the form of refuse than there is spent lime, consequently I may employ other forms of spent lime or lime compounds in combination with said tanners' spent lime, or where there is an abundance of lime compounds I may substitute saw-dust or like vegetable matter for said spent vegetable matter as this will result in the production of a similar mixture for the purification of coal gas as is hereinbefore described.

It is obvious that I may employ other substances than lime which with their admixture with the spent vegetable matter and iron compound will form the ferric oxid or ferric hydrate desired.

As is well known it is usual to burn the spent vegetable matter from tanneries, this resulting in the expenditure of much time and labor as well as cost of fuel. Tanners' spent lime is also convertible into a valuable product, hence by using these two compounds which have hitherto been treated entirely as refuse in the manufacture of a compound of a very useful nature, a great saving is effected.

The spent lime containing colloids, tends to produce the ferric hydrate in a more pronounced colloidal condition, with enhanced activity as a reagent.

I may, if desired, mix the spent vegetable matter and the lime, and then add the soluble compound of iron, as a similar result is obtained thereby to that as hereinbefore described.

The spent lime from tanneries contains many organic substances which have been dissolved from the hide. Albuminous matters, colloids, such as gelatin, etc. are present, and have the property of distributing other substances in thin permeable films. The ferric hydroxid, deposited on the spent tan bark, is more finely divided and porous by reason of its having been precipitated in a solution of colloids than it is when precipitated in their absence.

As an example of the relative amounts of the compounds which I use, I find that a suitable admixture consists in absorbing one ton of copperas by one ton of spent tan with the addition of heat, and adding about one ton and a quarter of spent lime, the latter being added in excess. In all cases lime must be added in excess.

I claim:—

1. The method of preparing a purifier for gas, which comprises precipitating an iron compound on a fibrous cellular support by an alkaline solution containing a dissolved colloid.

2. The method of preparing a purifier for gas, which comprises precipitating an iron compound on a fibrous cellular support by an alkaline solution containing extracted organic matter from hides.

3. The method of preparing a purifier for gas, which comprises precipitating an iron compound on spent tan bark by a solution containing spent lime from tanneries.

4. A purifier for gas, which comprises a cellular organic body having films containing a precipitated iron compound, a calcium compound, and a colloid, distributed throughout its mass.

5. A purifier for gas, which comprises spent tan bark carrying on the walls of its cells films containing a precipitate of iron hydroxid, a calcium compound, and organic matter from hides.

HUBERT CLIFTON MARRIS.